United States Patent [19]

Arkles

[11] Patent Number: 4,714,739
[45] Date of Patent: Dec. 22, 1987

[54] CURABLE SILICONE SEMI-INTERPENETRATING POLYMER NETWORKS AND METHODS OF MAKING SAME

[75] Inventor: Barry C. Arkles, Oreland, Pa.

[73] Assignee: Petrarch Systems Inc., Bristol, Pa.

[21] Appl. No.: 577,113

[22] Filed: Feb. 6, 1984

Related U.S. Application Data

[63] Continuation-in-part of Ser. No. 370,000, Apr. 20, 1982, Pat. No. 4,500,688.

[30] Foreign Application Priority Data

Apr. 20, 1983 [DE] Fed. Rep. of Germany ....... 3314355
Apr. 20, 1983 [JP] Japan .................. 58-68531

[51] Int. Cl.$^4$ .......................... C08L 83/05; C08L 9/00
[52] U.S. Cl. ........................... 525/92; 525/101; 525/105; 525/106; 525/342; 525/453; 525/455
[58] Field of Search .................. 525/101, 105, 106, 92, 525/342, 453

[56] References Cited

U.S. PATENT DOCUMENTS

| | | | |
|---|---|---|---|
| 3,288,879 | 11/1966 | Safford | 525/105 |
| 3,350,337 | 10/1967 | Campbell | 525/106 |
| 3,642,936 | 2/1972 | Hodge et al. | 525/101 |
| 3,715,334 | 2/1973 | Karstedt | 528/15 |
| 3,775,452 | 11/1973 | Karstedt | 260/429 R |
| 3,956,419 | 5/1976 | Murray . | |
| 3,960,985 | 6/1976 | Cooper | 525/101 |
| 4,230,815 | 10/1980 | Itoh et al. | 525/101 |
| 4,302,553 | 11/1981 | Frisch et al. | 525/28 |
| 4,528,326 | 7/1985 | Dean | 525/92 |
| 4,530,965 | 7/1985 | Bourland | 525/67 |

FOREIGN PATENT DOCUMENTS

| | | |
|---|---|---|
| 39349 | 12/1972 | Japan . |
| 99135 | 9/1974 | Japan . |
| 112453 | 9/1975 | Japan . |
| 122161 | 10/1976 | Japan . |
| 9223 | 3/1977 | Japan . |
| 41704 | 10/1980 | Japan . |
| WO82/02204 | 7/1982 | World Int. Prop O. ........... 525/105 |

OTHER PUBLICATIONS

L. H. Sperling, "Interpenetrating Polymer Networks and Related Materials", Plenum Press, New York & London, 1981, Chapter 1, pp. 3–5.
W. Noll, Chemie und Technologie der Silicone, 2nd Edition, 1968, pp. 317, 318, 321, 363.

*Primary Examiner*—Wilbert J. Briggs, Sr.
*Attorney, Agent, or Firm*—Panitch Schwarze Jacobs and Nadel

[57] ABSTRACT

Melt processable pseudointerpenetrating polymer networks (pseudo- or semi-IPNs) of silicones in thermoplastic matrices and methods of producing same are provided by vulcanizing the silicones within the matrices. The silicone component of the network is preferably the reaction product of a polymeric hydride group-containing silicone and a polymer containing at least one unsaturated group, preferably a vinyl group. The polymer containing unsaturated groups may be a silicone polymer also, or may be a non-silicone polymer such as a styrene, butadiene or urethane polymer or copolymer. Depending on certain parameters chain-extended (thermoplastic) or cross-linked (thermosetting) compositions are produced.

29 Claims, No Drawings

CURABLE SILICONE SEMI-INTERPENETRATING POLYMER NETWORKS AND METHODS OF MAKING SAME

CROSS-REFERENCE TO RELATED APPLICATION

This application is a continuation-in-part of my co-pending U.S. application Ser. No. 370,000, filed Apr. 20, 1982, now U.S. Pat. No. 4,500,688 for "Curable Silicone Containing Compositions."

BACKGROUND OF THE INVENTION

This invention concerns compositions which can be described as melt processable pseudointerpenetrating networks of silicones in thermoplastic matrices. This invention also relates to methods for the formation of these compositions.

Previous investigations have demonstrated that silicones may be incorporated into thermoplastic resins at low levels in order to enhance wear, friction and release properties. These silicones, however, are low molecular weight resins which are readily extractable from the matrix resins. Incorporation of silicone at levels above 2% can cause catastrophic reductions in mechanical properties and melt rheology.

The present invention reveals that judiciously selected silicone systems which are vulcanized within a thermoplastic matrix to form pseudointerpenetrating polymer networks (also referred to as semi-interpenetrating polymer networks or semi-IPNs) will not adversely affect polymer properties.

Interpenetrating polymer networks are described by L. H. Sperling in *Interpenetrating Polymer Networks and Related Materials*, Plenum Press, New York and London (1981). A full or true interpenetrating polymer network (IPN) is a material containing two polymers, each in network form, with the two polymers having been polymerized or vulcanized independently in the presence of each other to form two networks which are intertangled (interpenetrated) with each other. The IPNs may be formed in different manners, with the synthesis (polymerization) and/or cross-linking (vulcanization) of the two polymers being sequential or simultaneous. Another mode of IPN synthesis involves simultaneous coagulation and cross-linking of two latex polymers to form an interpenetrating elastomeric network.

One type of IPN system is illustrated in U.S. Pat. No. 4,302,553 of Frisch et al. IPNs of this sort involve a blend of two different prepolymers cross-linked in independent processes and permanently entangled with one another. These IPNs are thermoset in character.

Semi- or pseudo-IPNs have only one cross-linked phase or network which is within a continuous unlinked polymer matrix phase. It is possible with certain solvent soluble resins to extract this non-cross-linked phase, whereas that is not possible for the true IPN. As a result, the true IPN systems must be cast since once the components are admixed and the polymer formation takes place, the interpenetrating networks cannot be separated. The single cross-linked network of the pseudo- or semi-IPNs allows these materials to retain thermoplastic character, although pseudo-IPNs with thermosetting properties are also possible.

SUMMARY OF THE INVENTION

There have now been discovered new compositions comprising a silicone component vulcanized within a polymeric thermoplastic matrix to form a pseudointerpenetrating polymer.

This invention is also directed to methods of producing pseudointerpenetrating silicone polymer networks by curing or vulcanizing a silicone within a polymeric thermoplastic matrix at elevated temperatures, preferably during normal thermoplastic melt processing.

Advantageous characteristics of the compositions of this invention are surface and dielectric properties which approach those of silicones and mechanical properties which approach those of the thermoplastic matrices. To achieve these pseudo- or semi-IPNs, only components of the silicone network react with themselves (e.g. silicone hydrides with vinylsilicones). The matrix thermoplastic is essentially "inert" and unaffected by the cross-linking process.

DETAILED DESCRIPTION OF THE INVENTION

The compositions of this invention are formed by the catalyzed curing or vulcanization of a silicone in a compatible polymeric thermoplastic matrix at elevated temperature. A silicone is any of a large group of siloxane polymers based on a structure comprising alternate silicon and oxygen atoms with various organic radicals attached to the silicon.

The amount of silicone in the resultant compositions of the present invention can range from between about 1 weight percent and about 60 weight percent.

Vulcanization (curing) can be defined as any treatment that decreases the flow of an elastomer, increases its tensile strength and modulus, but preserves its extensibility. These changes are generally brought about by the cross-linking reactions between polymer molecules, but for purposes of this invention, vulcanization is used in a broader sense to include chain extension as well as cross-linking reactions.

The polymeric thermoplastic matrices of this invention include conventional thermoplastic resins including, but not limited to polyamides, thermoplastic polyurethanes, bisphenol A polycarbonates, styrenics, polyolefins, polyacetals, styrene-butadiene copolymers, polyolefin elastomers, polyamide-polyether elastomer base resins, etc.

In one embodiment of this invention, a two-part vulcanizing silicone which, depending on molecular structure, will undergo predominantly chain extending or cross-linking reactions, is vulcanized in a suitable thermoplastic matrix. One polymeric silicone component of the two part silicone contains silicone hydride (Si-H) groups. The other polymeric component contains unsaturated groups, preferably vinyl. Non-limiting examples of other unsaturated groups that can be employed include allyl —$CH_2CH=CH_2$ and hexenyl —$(CH_2)_4CH=CH_2$. Alternatively, both the hydride and unsaturated group can be part of one polymeric silicone. In the presence of a catalyst, generally a platinum complex, silicone hydride adds to the unsaturated group, e.g., a vinyl group, to create an ethylene linkage as follows:

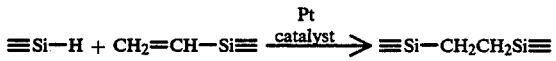

The principles of this chemistry are well-known to those skilled in the art. This chemistry is adapted in a number of ways for specific polymer systems. The substituents are varied to achieve an appropriate degree of compatibility with the matrix resin. The molecular weight and amount of reactive groups are varied in order to achieve the desired cross-link density. Finally, the ratio of silicone to matrix polymer is varied.

In another embodiment, the silicone component of the compositions of the invention may be hybrid silicones instead of pure silicones. These hybrids may be formed by the reaction of a hydride-containing silicone with a vinyl polymer (or other unsaturated group-containing polymer) which is not a silicone or siloxane polymer. Examples of such unsaturated group-containing polymers include styrene, butadiene and urethane polymers and copolymers, such as styrene-butadiene copolymers, butadiene-urethane copolymers, SEBS (styrene-ethylene-butylene-styrene) block copolymers, polybutene oil, etc. The urethane component of butadiene-urethane copolymers may be formed in situ in the thermoplastic matrix.

Where a butadiene polymer or copolymer is used as the source of unsaturated groups, it is preferred that the polymer or copolymer contain a significant proportion of poly 1,2-butadiene units. Thus, better reaction is obtained with the hydride groups where the vinyl groups extend from the polymer chain than where the vinyl groups are in the polymer chain, such as is the case with poly 1,4-butadiene. When calculating the ratios of hydride groups to vinyl groups, as discussed above, it is therefore necessary in the case of polybutadiene where there are both 1,4 and 1,2 vinyl groups to calculate the stoichiometric proportions on the basis of the amount of 1,2 butadiene in the polymer or copolymer. In the case of polybutene oil, there is one double bond at the chain terminus which can react with the hydride of the silicone.

In a further embodiment of the invention modified polymers may be used as the source of vinyl or unsaturated groups. For example, triethoxysilyl modified poly 1,2 butadiene may be used to improve filler interaction of the composition. In this modified polymer, three of the bonds of the poly 1,2 butadiene will have Si-(OCH$_2$CH$_3$)$_3$ groups along the polymer chain, and the 1,2 vinyl groups will react with the hydride functional silicone.

Vinyl-containing polymers that can be employed in the present invention have viscosity ranges of between about 500 and about 100,000 ctsk, with polymers having viscosities of between about 1,000 and about 65,000 ctsk preferred. Hydride-containing polymers that can be utilized in the present invention have viscosities of between about 35 and about 10,000 ctsk, with a preferred viscosity range of between about 500 ctsk and about 1,000 ctsk. Molecular weights are correlated to viscosity. Thus a vinyl terminated polymer having a viscosity of 1,000 ctsk has a molecular weight of 28,000.

In a preferred embodiment of this invention, pellets are formed of the compositions of this invention. These pellets can be readily utilized for injection molding or extrusion. The pellets may either contain silicones which have been vulcanized or contain all the materials necessary to form the vulcanizate during injection molding or extrusion.

In this preferred embodiment, reactive silicone components are confined to separate solid pellets of matrix resin (e.g. urethane). The pellets are handled as a homogeneous mix. Upon entering the melt state in conventional injection molding or extrusion equipment, the confinement of reactive silicones to individual pellets collapses, and they begin to react with each other forming a pseudointerpenetrating polymer network. While it is essential that the reaction is initiated in the melt, it will proceed in the solid state. Within two to three hours of entering the melt state, the property development associated with the formation of the pseudo-IPN is substantially complete. Little or no difference between this processing and conventional resin processing during extrusion or injection molding is observed.

The silicones of this invention will generally undergo one of two types of mechanisms, namely, chain-extension or cross-linking. The silicones which during vulcanization undergo primarily chain-extension yield thermoplastic components (plastics capable of being repeatedly softened by increases in temperature and hardened by decreases in temperature). Silicones which undergo primarily cross-linking during vulcanization yield compositions that have thermosetting properties (resins which cure by chemical reaction when heated and, when cured, cannot be resoftened by heating).

In the case of the predominantly chain-extended or thermoplastic compositions of this invention, a thermoplastic resin is combined with silicone components including a hydride-containing silicone and a vinyl polymer. The vinyl polymer generally contains from about two to about four vinyl groups, preferably with two such groups in terminal postions. The hydride-containing silicone contains 1 to 2 times the equivalent of the vinyl functionality. The two silicones are mixed in a ratio so that the hydride groups to vinyl groups is between about 1.2:1 and about 6:1.

Theoretically only a 1:1 ratio is necessary, but it has been found that a higher ratio as indicated above is required. The silicone hydride polymers are not as stable as the silicone vinyl polymers. In the presence of amines or hydroxyls, the silicone hydrides can react and liberate hydrogen thus yielding SIN≡ or Si—OR. Thus the simplest practical solution to this problem is to maintain hydride levels higher than stoichiometric requirements.

The typical remaining substituents on the silicones are methyl groups. However, in order to insure compatability with the thermoplastic matrix resin other groups such as phenyl, longer chain alkyl or cyanopropyl groups may replace some of the methyl groups.

A platinum complex preferably derived from chloroplatinic acid and a vinyl siloxane is added to the mixture just prior to meltmixing so that the amount of platinum is equal to 1–15 ppm. The vinyl siloxane forms an active complex with the platinum which is soluble in the silicones to be cross-linked. The mixture is meltmixed by a process such as extrusion and is then pelletized.

A predominantly cross-linked structure in which the resulting composition has thermosetting properties is achieved by extruding the vinyl polymer and hydride-containing silicones separately into two portions of the base polymer. The vinyl-containing polymer contains from about two to about thirty vinyl groups and the hydride-containing silicone contains from two to ten times the equivalent of the vinyl functionality. In this case the hydride functional silicone is the cross-linker since it contains a relatively high number of sites per chain for cross-linking. The relationship of these two materials can, however, be reversed. The ultimate ratio of the vinyl polymer and hydride-containing silicone is adjusted in either case so that the ratio of the hydride groups to the vinyl groups in the composition is between about 1.2:1 and about 6:1.

Once the separate extrusions are prepared, a physical blend of the pellets is made. A platinum complex is then tumbled into the mixture. When the pellets are melted together, the vinyl and hydride groups react. Most of the thermosetting reaction takes place during injection molding or extrusion of the mixture and may be completed during a post-cure. A number of permutations of the above are evident to those skilled in the art. One component pellet could contain for example predominatly vinyl polymer with some of the hydride silicone. In some instances, the two polymers do not have to be isolated prior to melt mixing. In fact, vinyl groups and hydride groups can be on the same silicone chain. Having the materials in separate pellets reduces (or eliminates) surface cure of the pellets. Another solution to this problem would be to use a fugitive inhibitor at the platinum catalyst.

The mechanical and physiological properties of silicone IPN modified thermoplastics are at a minimum the mechanical properties of the matrix resin. In many areas including wear, lubricity and heat and abrasion resistance, they are improved. In high cross-link density systems, the resilience and resistance to creep (set) of the resins is enhanced.

Silicone IPN modified polyurethanes exhibit a considerable range of properties. In the middle are the materials for biomedical applications. They demonstrate tear and tensile strengths 3-5 times that of silicones. Initial biocompatibility tests indicate lower blood protein absorption than silicone and unmodified polyurethane. Aliphatic urethanes which are believed to present a lower health risk, particularly when steam-sterilization is part of use protocol, also produce excellent materials. At the low modulus end, flexible silicone-urethanes with durometers as low as 60A have been prepared. At the high modulus end carbon fiber reinforced high durometer silicone-urethanes with stengths approaching die cast metals are possible.

While this technology was originally developed in polyurethane systems, it has been extended to other thermoplastic elastomers and engineering thermoplastics. Polyester elastomer, EPDM and SBS type block copolymers and others have been demonstrated as matrix resins in these systems. Silicone-SBS systems appear to be excellent candidates for catheter and other disposable applications. Polyamide (nylon) and polyester engineering thermoplastics have been formulated into materials which appear to be particularly well suited for gear and bearing applications. For example, the incorporation of 5% silicone-IPN into nylon 6/6 increases the heat distortion temperature at 264 psi applied load by 30° to 200° F.

The invention is further described by reference to the following specific, non-limiting examples.

EXAMPLE 1

A homogeneous physical blend of the following materials was prepared:

| | |
|---|---|
| nylon 6/6, Monsanto molding grade pellets | 9000 g |
| polydimethylsiloxane, vinyldimethylsiloxy terminated, 10,000 ctsk. | 400 g |
| polydimethylsiloxane, hydrodimethylsiloxy terminated, average of 1 hydrodimethylsiloxy group per chain, 10,000 centistokes (ctsk) | 600 g |

Within one hour of extrusion, 1 g of a platinum complex in methylvinylcyclosiloxane containing 3.5% Pt was added to the mixture. The platinum complexes utilized throughout the examples were the methylvinyl cyclic siloxane analogs of the Karstedt U.S. Pat. Nos. 3,715,334 and 3,775,452. The mixture was extruded at 340°-355° C. and chopped into pellet form. The pelletized composition was molded into standard ASTM specimens. The ASTM testing protocol was used for flexural strength, tensile strength and water absorption. Properties of the resultant composition are tabulated in Table I hereinbelow.

EXAMPLE 2

Utilizing the same silicones as described in Example 1 a moldable thermoplastic urethane/silicone composition was prepared.

| | |
|---|---|
| polyester urethane, Mobay Texin 55D | 9250 g |
| polydimethylsiloxane, vinyl terminated | 300 g |
| polydimethylsiloxane, hydride containing | 450 g |
| fumed silica, Cabot MS-7 | 5 g |
| platinum complex (added after extrusion) | 1 g |

Fumed silica served both as a reinforcing agent and a process aid. In this example, feed problems were observed and the fumed silica absorbed the silicone making it easier to process. The properties of specimens prepared from the above described pelletized extruded material are tabulated in Table I hereinbelow.

EXAMPLE 3

The following composition was extruded and molded:

| | |
|---|---|
| polyester urethane Mobay Texin 480A | 9000 g |
| polydimethylsiloxane- 3% diphenylsiloxane copolymer, vinyldimethylsiloxy terminated | 400 g |
| polydimethylsiloxane, hydride containing | 600 g |
| platinum complex (added after extrusion) | 1 g |

Properties of the composition formed according to Example 3 are given in Table I hereinbelow.

EXAMPLE 4

The following composition was extruded and molded:

| | |
|---|---|
| bisphenol A polycarbonate, Mobay M-50 | 9500 g |
| polydimethylsiloxane- 10% phenylmethyl siloxane copolymer, vinyldimethylsiloxy terminated | 200 g |
| polydimethylsiloxane, hydride containing | 300 g |
| platinum complex (added after extrusion) | 1 g |

Properties of the composition formed according to Example 4 are given in Table I hereinbelow.

EXAMPLE 5

The following mixtures were extruded then pelletized:

| Part A | |
|---|---|
| polyester urethane, Mobay Texin 480A | 9000 g |
| polydimethylsiloxane- 15% methylhydrosiloxane copolymer, trimethylsiloxy terminated 10,000 ctsk | 500 g |
| polydimethylsiloxane, vinyldimethylsiloxy terminated 65,000 ctsk | 500 g |
| amorphous silica, Minusil | 50 g |
| Part B | |
| polyester urethane, Mobay Texin 480A | 8800 g |
| polydimethylsiloxane, vinyl terminated 65,000 ctsk | 1200 g |
| amorphous silica | 25 g |

Part A and Part B were extruded separately. A 1:1 (weight ratio) physical blend of two different extrusions was made. 2.5 g of platinum complex and 5 g of 3-methylbutynol, a fugitive inhibitor of hydrosilylation (hydrosilylation is the process of adding Si—H across a double bond) were tumbled into the mixture and prior to hermetically sealing it in a can.

The mixture was molded under normal conditions and post-cured an additional 1 hour at 80° C. Properties of the composition formed according to Example 5 are given in Table I hereinbelow.

EXAMPLE 6

The following mixtures were melt-mixed on a twin screw extruder and pelletized:

| Part A | |
|---|---|
| styrene-ethylene-butylene-styrene (block copolymer), Shell Kraton 1651 | 1300 g |
| polydimethylsiloxane, vinyl terminated 1000 ctsk | 500 g |
| polypropylene powder | 200 g |
| Part B | |
| styrene-ethylene-butylene-styrene (block copolymer), Shell Kraton 1651 | 1700 g |
| polydimethyl-30% methylhydrosiloxane polymer - 25-30 ctsk | 100 g |
| polypropylene powder | 200 g |

A 5:1 physical blend of Part A to Part B was prepared. 1 g of platinum complex was added and ASTM parts were injection molded on a reciprocating screw machine. Properties of the resulting composition are given in Table II hereinbelow.

EXAMPLE 7

The following mixture was melt-mixed on a twin screw extruder:

| Part A | |
|---|---|
| styrene-ethylene-butylene-styrene, (block copolymer) Shell Kraton 1651 | 1400 g |
| polydimethyl 30-35% methyloctylsiloxane vinyl terminated 1000 ctsk | 500 g |
| polypropylene | 100 g |

This was blended 5:1 with Part B of Example 6, catalyzed and injection molded. Properties are reported in Table II hereinbelow.

EXAMPLE 8

Homogeneous physical blends of the following materials were prepared:

| Mix A | |
|---|---|
| Polyester urethane, Mobay Texin 480A | 95% |
| Polystyrene 30% - polybutadiene 70% copolymer containing 20 mole % poly 1, 2-butadiene units of (MWN 5000), Ricon 182 | 5% |
| Mix B | |
| Polyester urethane, Mobay Texin 480A | 90% |
| Polymethyloctyl siloxane 40-60% - Polymethylhydrosiloxane 40-60% (MWN 4300) | 10% |

The mixes were meltmixed at 180°–190° C. separately on a twin screw Leistitz extruder, stranded and pelletized. A 1:1 mechanical blend of the two materials was prepared. To 10 Kg of the blend 1 g of a platinum complex in methylvinylcyclosiloxane containing 3.5% Pt was added.

The pelletized composition was molded into ASTM specimens and the properties are reported in Table III. Change in surface appearance compared to the pellets was immediately observable along with the disappearance of a surface tack.

EXAMPLE 9

Mix A of Example 8 was combined in a 1:1 ratio with the following:

| Mix B | |
|---|---|
| Polyester urethane, Mobay Texin 480A | 90% |
| Polydimethyl siloxane 70% - polymethyl hydrosiloxane 30% copolymer (MWN 2000) | 10% |

After addition of platinum catalyst the blend was injection molded. The material was then post-cured 3 hours at 70° C. The material maintained a more reflective surface than in Example 8 but also lost surface tack. The physical properties are reported in Table III.

EXAMPLE 10

In a manner consistent with Example 8 a blend of polyurethane with a polybutadiene-polyurethane copolymer was prepared and used as Mix A. The polybutadiene-polyurethane copolymer was prepared in situ from the following reactants:

| | |
|---|---|
| polyester urethane, Mobay Texin 480A | 95% |
| polybutadiene, hydroxyl terminated containing 20% poly 1, 2 butadiene (MWN 2800) | 4.7% |
| cyclohexyldiisocyanate | 0.3% |
| dibutyl tin dilaurate | 25 ppm |

The physical properties of the specimens produced as in Example 8 are reported in Table III.

EXAMPLE 11

In a manner consistent with Example 8, the following was used as Mix A:

| | |
|---|---|
| polyester urethane, Mobay Texin 480A | 95% |
| polybutadiene, hydroxyl terminated | 4.4% | containing 90% poly 1, 2 butadiene
(MWN 1350), Nippon G-1000
cyclohexyldiisocyanate 0.6%
dibutyl tin dilaurate 25 ppm This composition was combined in a 2:1 ratio with Mix B of Example 8 and catalyzed. The physical properties of the specimens produced as in Example 8 are reported in Table III.

EXAMPLE 12

Homogeneous physical blends of the following materials were prepared:

| Mix A | |
|---|---|
| styrene-ethylene-butylene-styrene block copolymer, Shell 1651 | 90% |
| polystyrene 30% - polybutadiene 70% containing 20 mole % of poly 1, 2-butadiene units (MWN 5000), Ricon 182 | 10% |
| Mix B | |
| styrene-ethylene-butylene-styrene block copolymer, Shell 1651 | 80% |
| polymethyloctylsiloxane 40-60% - polymethylhydrosiloxane 40-60% (MWN 4300) | 20% |

These mixes were melt mixed separately at 160°–175° C. and processed further in the same manner as Example 8. The physical properties are reported in Table III.

In general, the compositions of the present invention show greater resilience (i.e. resistance to compression-set or tensile-set) than the corresponding thermoplastics which form the matrices of the compositions. In the case of low strength matrix materials such as styrene-ethylenebutadiene-styrene (SEBS) block copolymers, a large increase in mechanical properties is also observed with the compositions of the invention. Modest increases in mechanical properties are also seen in urethane based matrices, while nylon matrices show similar mechanical properties to the unmodified polymers.

EXAMPLE 13

A 3 neck 3 L flask was charged with 600 g of poly 1,2-butadiene, 884 mls of toluene, and 30 mls of triethoxysilane. The poly 1,2-butadiene was Ricon 153 M.W. 3000. The mixture was warmed to 40° C. and 0.5 cc of a 0.1M solution of chloroplatinic acid in tetrahydrofuran was added. A very mild exotherm was observed. The balance of the triethoxysilane was added over three hours. The temperature was raised to 70° C. and 0.5 cc additional chloroplatinic acid was added. The mixture was allowed to cool and was filtered through charcoal. Infra-red showed no residual silicon hydride. The final viscosity was 30–40 ctsks of the triethoxysilyl modified poly 1,2-butadiene.

EXAMPLE 14

Under the same conditions as example 12, the following mixture was prepared and extruded, using the triethoxysilyl modified poly 1,2-butadiene prepared in Example 13:

| Mix A | |
|---|---|
| Styrene ethylene-butylene styrene | 7500 g |
| Polypropylene | 500 g |
| Triethoxysilyl modified poly 1,2-butadiene (10 parts charged of solution) | 500 g |
| Talc | 1500 g |
| Mix B | |
| Styrene ethylene butylene styrene | 8000 g |
| Polypropylene | 1000 g |
| Polymethylhydro 40–60% polymethyloctylsiloxane | 1000 g |

A 1:1 mechanical blend of Mix A and Mix B were extruded. Mechanical properties are given in Table III.

EXAMPLE 15

The following composition was prepared as a single extrusion and molded:

| | |
|---|---|
| Polyolefin elastomer, Monsanto Santoprene 101-64 | 9000 g |
| Polydimethylsiloxane - 30% methyloctylsiloxane 4% methylvinylsiloxane, Trimethylsiloxy terminated, DP = 90–100 | 830 g |
| Polydimethylsiloxane, 35% methylhydrosiloxane copolymer, DP = 35–40 | 170 g |
| Platinum complex (added after extrusion) | 1 g |

Properties of this composition are given in Table IV.

EXAMPLE 16

The following composition was prepared as a single extrusion and molded:

| | |
|---|---|
| Polyolefin elastomer, Monsanto Santoprene 101-64 | 8000 g |
| Polybutene oil, viscosity: 30,000 Chevron PolyS32 | 1670 g |
| Polydimethylsiloxane, 35% methylhydrosiloxane copolymer | 330 g |
| Platinum complex (added after extrusion) | 1 g |

Properties of this composition are given in Table IV.

EXAMPLE 17

The following mixtures were extruded separately, combined mechanically and molded:

| Part A | |
|---|---|
| Styrene-ethylene-butadiene-styrene block copolymer, Shell Kraton 1650 | 3340 g |
| Polydimethylsiloxane - 30% methyloctylsiloxane 4% methylvinylsiloxane copolymer, trimethylsiloxy terminated | 830 g |
| Polypropylene powder | 830 g |
| Part B | |
| Styrene-ethylene-butadiene-styrene block copolymer, Shell Kraton 1650 | 3340 g |
| Polymethyloctylsiloxane, 25% Methylhydrosiloxane copolymer trimethylsiloxy terminated | 830 g |
| Polypropylene powder | 830 g |

Part A was blended with Part B on a 5:1 ratio catalyzed with platinum complex and injection molded. Properties of this composition are given in Table IV.

EXAMPLE 18

The following composition was extruded and molded:

| | |
|---|---|
| Polyamide-polyether elastomer, Emser Grilamid Ely 60 | 9500 g |
| Polydimethylsiloxane, vinyldimethylsiloxy terminated, 10,000 ctsk | 250 g |
| Polydimethylsiloxane, methylhydrosiloxane copolymer, | 250 g |

-continued

| | |
|---|---|
| average of 4 methylhydrosiloxy groups per chain | |
| Platinum complex | 1 g |

Properties of this composition are given in Table IV.

EXAMPLE 19

The following composition was prepared as a single extrusion and molded:

| | |
|---|---|
| Polyether urethane, Upjohn's Pellathane 2363-70A | 7500 g |
| Polydimethylsiloxane, 15% diphenylsiloxane, vinyldimethyl terminated | 2458 g |
| Polydimethylsiloxane, 35% methylhydrosiloxane copolymer | 42 g |
| Platinum complex (added after extrusion) | 1 g |

Properties of this composition are given in Table IV.

The present invention may be embodied in other specific forms without departing from the spirit or essential attributes thereof and, accordingly, reference should be made to the appended claims, rather than to the foregoing specification, as indicating the scope of the invention.

TABLE I

| | Examples | | | | |
|---|---|---|---|---|---|
| Properties | 1 | 2 | 3 | 4 | 5 |
| Thermoplastic base | Nylon 6/6 | Polyester Urethane | Polyester Urethane | Bisphenol A Polycarbonate | Polyester Urethane |
| Melt Characteristics | Thermoplastic | Thermoplastic | Thermoplastic | Thermoplastic | Moderate Thermoset |
| % Silicone | 10 | 7.5 | 10 | 10 | 11 |
| Flexural Strength, psi | 15,900 | 730 | | 11,000 | |
| Flexural modulus, psi | 390,000 | — | | 325,000 | |
| Izod impact strength, ft-lb/in | | | | | |
| notched | 0.8 | >40 | | >40 | |
| unnotched | 21.3 | >40 | | 16 | |
| Water absorption % (24 hours) | 1.2 | .03 | .04 | .15 | .04 |
| Tear Strength ("C"), pli | | 750 | 450 | | 500 |
| Tensile Strength, psi | 9,600 | | 6200 | | 6000 |

TABLE II

| Properties | 6 | 7 |
|---|---|---|
| Thermoplastic base | SEBS* | SEBS |
| Melt characteristics | Moderate Thermoset | Moderate Thermoset |
| % Silicone | 22% | 20% |
| Flexural modulus at 300% (psi) | 450 | 500 |
| Tear strength (pli) | 100 | 150 |
| Tensile strength (psi) | 800 | 1200 |

*Styrene-ethylene-butadiene-styrene (block copolymer)

TABLE III

| | Examples | | | | | |
|---|---|---|---|---|---|---|
| Properties | 8 | 9 | 10 | 11 | 12 | 14 |
| Thermoplastic base | Polyester Urethane | Polyester Urethane | Polyester Urethane | Polyester Urethane | SEBS | SEBS |
| Silicone/Hybrid | styrene 1,2-butadiene | styrene 1,2-butadiene | urethane 1,2-butadiene | urethane 1,2-butadiene | styrene/butadiene | silyl-modified butadiene |
| % Silicone hybrid | 7.5% | 7.5% | 7.5% | 7.5% | 15% | 7.5% |
| Hardness | 80 A | 80 A | 80 A | 80 A | 70 A | 90 A |
| Tensile strength | 6500 | 6000 | 6800 | 6900 | 1000 | 1500 |
| Tear strength | | | | | 150 | 200 |
| Elongation | 520% | 475% | 550% | 520% | | |

TABLE IV

| PROPERTIES | 15 | 16 | 17 | 18 | 19 |
|---|---|---|---|---|---|
| Thermoplastic base | Olefin Elastomer | Olefin Elastomer | Styrene-ethylene butadiene-styrene block copolymer | Polyamide-polyether Elastomer | Polyether Urethane |
| Melt Characteristics | Thermoplastic | Thermoplastic | Thermoplastic | Thermoplastic | Thermoplastic |
| % Silicone | 10 | 3.3 | 16.6 | 5 | 25 |
| Tensile strength, psi | 900 | 850 | 3000 | 5500 | 2000 |
| Tear strength, (C) pli | 120 | 120 | 310 | — | 300 |
| Flexural strength, psi | — | — | — | 2200 | — |
| Flexural Modulus, psi | — | — | — | 35000 | — |
| Hardness, Shore A | 62 | 60 | 65 | — | 57 |

What is claimed is:

1. A melt processable composition comprising a polymeric thermoplastic matrix, a hydride group-containing silicone, a non-silicone polymer containing at least one unsaturated group, and a catalyst which will catalyze the reaction of said polymer with said hydride group-containing silicone, said silicone and said polymer being selected and present in sufficient amounts to react with each other by vulcanization within said polymeric thermoplastic matrix to form a silicone semi-interpenetrating polymer network, said vulcanization of said silicone and said polymer being initiated during thermoplastic melt-processing of said composition.

2. A composition according to claim 1 wherein said silicone ranges from between about 1 weight percent and about 60 weight percent based on the total weight of the composition.

3. A composition according to claim 1 wherein said thermoplastic matrix is selected from the group consisting of polyamides, thermoplastic polyurethanes, bisphenol A polycarbonates, styrene-ethylene-butylene-styrene block copolymers, polyacetals, polyolefins, styrene-butadiene copolymers, polyolefin elastomers, and polyamide-polyether elastomer base resins.

4. A composition according to claim 1 wherein said unsaturated group comprises a vinyl group.

5. A composition according to claim 4 forming a predominantly chain-extended structure wherein said vinyl-containing polymer contains from about two to about four vinyl groups and wherein said hydride-containing silicone contains 1 to 2 times the equivalent of said vinyl-containing polymer with the ratio of said hydride groups to said vinyl groups being between about 1.2:1 and about 6:1.

6. A composition according to claim 4 wherein the vinyl-containing polymer has two vinyl groups in terminal positions.

7. A composition according to claim 4 forming a predominantly cross-linked structure wherein said vinyl-containing polymer contains from about two to about thirty vinyl groups and said hydride-containing silicone contains from two to ten times the equivalent of said vinyl-containing polymer with the ratio of the hydride groups to the vinyl groups being between about 1.2:1 and about 6:1.

8. A composition according to claim 1 wherein said silicone further comprises constituents selected from the group consisting of methyl groups, phenyl groups, longer chain alkyl groups or cyanopropyl groups.

9. A melt-processable composition according to claim 1 wherein said thermoplastic melt-processing of said composition within said matrix comprises melt-mixing.

10. A composition according to claim 4 wherein the vinyl group is on a vinyl polymer selected from the group consisting of styrene, butadiene and/or urethane polymers and copolymers.

11. A composition according to claim 10 wherein the vinyl group is on a butadiene copolymer or polymer containing a significant proportion of poly 1,2-butadiene units.

12. A composition according to claim 4 wherein the vinyl group is on a triethoxysilyl modified poly 1,2-butadiene.

13. A method for producing a silicone semi-interpenetrating polymer network comprising vulcanizing a silicone component by the reaction of a polymeric silicone containing hydride groups and a non-silicone polymer containing at least one unsaturated group within a polymeric thermoplastic matrix at least partially during thermoplastic melt-processing of said silicone component and said matrix.

14. A method according to claim 13 wherein said reaction is conducted in the presence of a catalyst.

15. A method according to claim 13 wherein said unsaturated group is a vinyl group.

16. A method according to claim 14 wherein said catalyst comprises a platinum complex.

17. A method according to claim 13 wherein said thermoplastic matrix is selected from the group consisting of polyamides, thermoplastic polyurethanes, bisphenol A polycarbonates, styrene-ethylene-butylene-styrene block copolymers, styrene butadiene copolymers, polyolefins, polyacetals, polyolefin elastomers, and polyamide-polyether elastomer base resins.

18. A method according to claim 13 wherein a predominantly chain-extended structure is formed by combining a hydride-containing silicone and a vinyl-containing polymer with the vinyl-containing polymer having from about two to about four vinyl groups and the hydride-containing silicone containing 1 to 2 times the equivalent of the vinyl functionality with the ratio of the hydride groups to the vinyl groups being about 1.2:1 to 6:1, adding a catalyst and melt-processing the resultant mixture.

19. A method according to claim 18 wherein said melt-processing comprises extrusion.

20. A method according to claim 18 wherein said melt-processing is followed by pelletizing.

21. A method according to claim 13 further comprising conducting the reaction in the presence of fumed silica.

22. A method according to claim 16 further comprising conducting the reaction in the presence of vinyl siloxane.

23. A method according to claim 15 wherein a predominantly cross-linked structure is formed by separately extruding the vinyl-containing polymer and hydride-containing silicone into separate portions of said thermoplastic matrix, mixing the portions, adding a catalyst and melting the portions together so as to react the vinyl-containing polymer and hydride-containing silicone.

24. A method according to claim 15 wherein a predominantly cross-linked structure is formed by extruding together the vinyl-containing polymer and hydride-containing silicone into said thermoplastic matrix in the presence of a platinum catalyst and a fugitive inhibitor and melt-processing the resultant mixture.

25. A method according to claim 23 wherein the vinyl-containing polymer contains from about two to about thirty vinyl groups and the hydride-containing silicone contains from two to ten times the equivalent of the vinyl functionality with the ratio of the hydride groups to the vinyl groups being about 1.2:1 to 6:1.

26. A method according to claim 15 wherein the vinyl group is on a vinyl polymer selected from the group consisting of styrene, butadiene and/or urethane polymers and copolymers.

27. A method according to claim 26 wherein the vinyl group is on a butadiene copolymer or polymer containing a significant proportion of poly 1,2-butadiene units.

28. A method according to claim 15 wherein the vinyl group is on a triethoxysilyl modified poly 1,2-butadiene.

29. A method according to claim 13 wherein said thermoplastic melt-processing of said silicone component and said matrix comprises themoplastic melt-mixing of said silicone component with said matrix.

* * * * *